J. C. STARBUCK.
Tree-Protector.
No. 49,453. Patented Aug. 15, 1865.
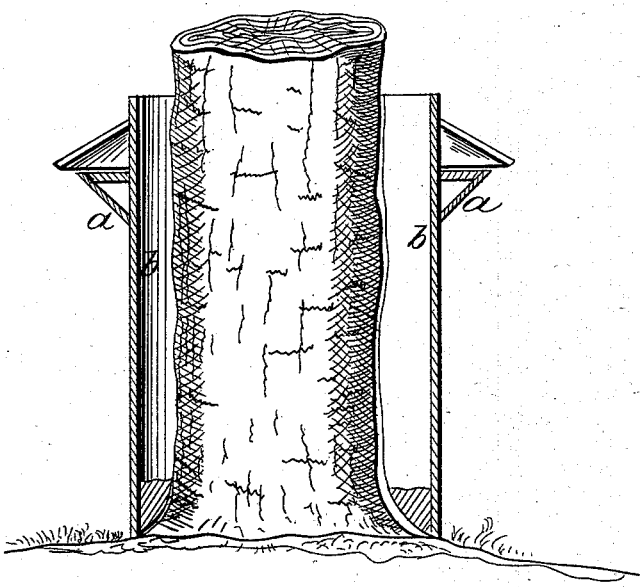

UNITED STATES PATENT OFFICE.

JAMES C. STARBUCK, OF CAMBRIDGE, MASSACHUSETTS.

IMPROVED TREE-PROTECTOR.

Specification forming part of Letters Patent No. 49,453, dated August 15, 1865.

*To all whom it may concern:*

Be it known that I, JAMES C. STARBUCK, of Cambridge, in the county of Middlesex and State of Massachusetts, have invented an Improved Tree-Protector; and I do hereby declare that the following, taken in connection with the drawing which accompanies and forms part of this specification, is a description of my invention sufficient to enable those skilled in the art to practice it.

It is well known that in certain sections of the country the foliage of many fruit and ornamental trees is destroyed for successive years by the insects known as "canker-worms," hatched from eggs deposited by wingless moths, which ascend the tree by crawling up the trunk, and lay their eggs upon the twigs and branches. To preserve the foliage it is necessary either to destroy these moths before the eggs are laid or to prevent their ascent into the tree.

The principal object of this invention is to prevent the ascent of the moths and worms by the interposition of an impassable barrier between the ground and the branches of the tree; and the invention consists in the application of a fluid-containing trough, not directly to the trunk of the tree, as heretofore practiced, but supported from the ground, and so as to leave a space between the trunk and the protector, which space may be wholly or partially packed with cement or other filling.

In the use of fluid-containing troughs upon trees it is customary to nail or fasten the band or strip of metal to which the trough is affixed directly to the trunk of the tree. This is objectionable, because many kinds of trees are injured by the nails, and because the spaces or crevices between the band and the tree afford a harbor for insects. Moreover, the bark of many trees is made tender, and is otherwise injuriously affected by shutting out the light and air from it.

To obviate these objections I mount the trough upon a pedestal or casing, which surrounds the tree in such manner as not only to afford a firm support to the trough, but to leave the trunk free from contact with the trough or its support. This will be understood from the drawing, which represents a sectional elevation of my invention as applied to a tree-trunk.

The trough *a* is fixed upon the top of a hollow stand or support, *b*, which is placed around the trunk and stands directly upon the ground. At its foot the space between the trunk and stand is filled with cement or other material, through which insects cannot pass, and the trough being filled with the liquid the tree will be securely protected without marring or injuring its trunk. The casing also serves to protect the tree from borers and other insects which attack the trunk near the ground. The trough is generally made of metal, but the support I prefer to make of wood. It may be square or round in cross-section, and, if of wood, is to be applied in sections or halves united after being placed around the trunk, the trough being subsequently applied. Other means of application might be suggested, but this will be obvious without further description.

I claim—

The tree-protector, as made of a fluid-containing trough placed upon a tubular stand surrounding the trunk and supported from the ground, substantially as and for the purpose specified.

In witness whereof I have hereunto set my hand this 8th day of July, A. D. 1865.

JAMES C. STARBUCK.

Witnesses:
 W. B. CROSBY,
 F. GOULD.